(12) United States Patent
Hepp et al.

(10) Patent No.: US 8,622,022 B2
(45) Date of Patent: Jan. 7, 2014

(54) ANIMAL FEEDER

(71) Applicants: Kenneth Robert Hepp, Oconomowoc, WI (US); Thomas J. Green, West Bend, WI (US)

(72) Inventors: Kenneth Robert Hepp, Oconomowoc, WI (US); Thomas J. Green, West Bend, WI (US)

(73) Assignee: Kenneth Robert Hepp, Oconomowoc, WI (US)

( * ) Notice: Subject to any disclaimer, the term of this patent is extended or adjusted under 35 U.S.C. 154(b) by 0 days.

(21) Appl. No.: 13/625,029

(22) Filed: Sep. 24, 2012

(65) Prior Publication Data

US 2013/0074776 A1 Mar. 28, 2013

Related U.S. Application Data

(63) Continuation of application No. 12/080,609, filed on Apr. 4, 2008, now Pat. No. 8,291,861.

(60) Provisional application No. 60/993,540, filed on Sep. 12, 2007, provisional application No. 60/966,501, filed on Aug. 28, 2007, provisional application No. 60/922,095, filed on Apr. 6, 2007.

(51) Int. Cl.
*A01K 5/00* (2006.01)

(52) U.S. Cl.
USPC ............................. 119/65; 119/57.8; 119/75

(58) Field of Classification Search
USPC .............................. 119/65, 57.8, 61.57, 74, 75
See application file for complete search history.

(56) References Cited

U.S. PATENT DOCUMENTS

| | | | | |
|---|---|---|---|---|
| 3,125,069 A | * | 3/1964 | Fowler | 119/77 |
| 4,026,244 A | * | 5/1977 | Salick | 119/57.8 |
| 4,104,987 A | * | 8/1978 | Winston | 119/57.8 |
| 4,233,941 A | * | 11/1980 | Webster | 119/52.2 |
| 4,535,819 A | * | 8/1985 | Atkinson et al. | 137/846 |
| 4,566,493 A | * | 1/1986 | Edwards et al. | 137/846 |
| 4,607,597 A | * | 8/1986 | Sevigny | 119/51.01 |
| 4,691,665 A | * | 9/1987 | Hefner | 119/77 |
| 4,706,851 A | * | 11/1987 | Hegedus et al. | 222/106 |
| 4,865,224 A | * | 9/1989 | Streck | 222/95 |
| 4,958,595 A | * | 9/1990 | Richman et al. | 119/52.2 |
| 5,010,925 A | * | 4/1991 | Atkinson et al. | 137/847 |
| 5,025,753 A | * | 6/1991 | Schneider | 119/51.03 |
| 5,156,300 A | * | 10/1992 | Spahni et al. | 222/105 |
| 5,303,674 A | * | 4/1994 | Hyde, Jr. | 119/77 |
| 5,479,881 A | * | 1/1996 | Lush et al. | 119/57.8 |
| 5,640,927 A | * | 6/1997 | Klein | 119/72 |
| 5,682,835 A | * | 11/1997 | Walter et al. | 119/57.8 |
| 5,806,460 A | | 9/1998 | Klein | |

(Continued)

OTHER PUBLICATIONS

Vernay Laboratories, Inc., "Duckbill Check Valve VA4838," product description, 1998, 2 pages, Aug. 24, 2007 website printout at http://www.vernay.com/decisiontree/product_detail.asp?vaid=VA4838&grp=3.

(Continued)

*Primary Examiner* — Yvonne Abbott

(74) *Attorney, Agent, or Firm* — Michael Best & Friedrich LLP

(57) ABSTRACT

An animal feeder includes a feed reservoir having a cavity for holding a feed material, and a feed dispensing assembly coupled to the feed reservoir. The feed dispensing assembly includes a check valve to allow selective access to the feed material. The check valve inhibits feed leakage from the feed reservoir during pressure fluctuations within the feed reservoir.

16 Claims, 14 Drawing Sheets

(56) References Cited

U.S. PATENT DOCUMENTS

| | | | | |
|---|---|---|---|---|
| 6,012,414 | A * | 1/2000 | Klein | 119/72 |
| 6,092,551 | A * | 7/2000 | Bennett | 137/846 |
| 6,341,718 | B1 * | 1/2002 | Schilthuizen et al. | 222/207 |
| 6,390,021 | B1 * | 5/2002 | Krenzel | 119/52.2 |
| 6,532,896 | B1 * | 3/2003 | Hurlbert | 119/57.8 |
| D504,745 | S * | 5/2005 | Leech | D30/124 |
| 6,928,957 | B2 * | 8/2005 | Espinda | 119/467 |
| 7,028,635 | B1 * | 4/2006 | Eastman, II | 119/51.11 |
| 7,093,562 | B2 | 8/2006 | Smothers | |
| D538,485 | S * | 3/2007 | Degironne | D30/124 |
| 7,287,489 | B1 * | 10/2007 | O'Brien | 119/712 |
| 7,448,347 | B2 * | 11/2008 | Richmond | 119/72 |
| 7,565,881 | B2 * | 7/2009 | Smothers | 119/72 |
| 7,596,930 | B2 | 10/2009 | Borchardt | |
| 7,600,487 | B2 * | 10/2009 | Stone et al. | 119/72 |
| 7,614,203 | B2 | 11/2009 | Oltrogge | |
| D606,708 | S * | 12/2009 | McMullen | D30/127 |
| 7,726,259 | B2 * | 6/2010 | Hepp et al. | 119/57.9 |
| 7,726,880 | B2 | 6/2010 | Zimmerman et al. | |
| 7,743,732 | B2 * | 6/2010 | Webber | 119/77 |
| 7,748,347 | B2 * | 7/2010 | Richmond | 119/72 |
| 7,798,714 | B2 | 9/2010 | Zimmerman et al. | |
| 8,291,861 | B2 * | 10/2012 | Hepp et al. | 119/65 |

OTHER PUBLICATIONS

Vernay Laboratories, Inc., "Check Valves: Engineering Fluid Control," product description, 1998, 4 pages, Oct. 28, 2008 website printout at http://web.archive.org/web/20070630141046/http://www.vernay.com/products/checkval.htm. (Website originally visited on Aug. 24, 2007.).

Vernay Laboratories, Inc., "Duckbill Check Valves," product description, 1998, 5 pages, Oct. 28, 2008 website printout at http://web.archive.org/web/20061231210457/http://vernay.com/products/duckill.htm. (Website originally visited on Apr. 3, 2007.).

LT. Blender's Piña Colada in a Bag, publicly available before Apr. 6, 2007.

Vernay Laboratories, Inc., "Duckbill Check Valve VA4838," product description, 1998, 2 pages, Aug. 24, 2007 website printout at http://www.vernay.com/decisiontree/product_detail.asp?vaid—VA4838&grp=3.

* cited by examiner

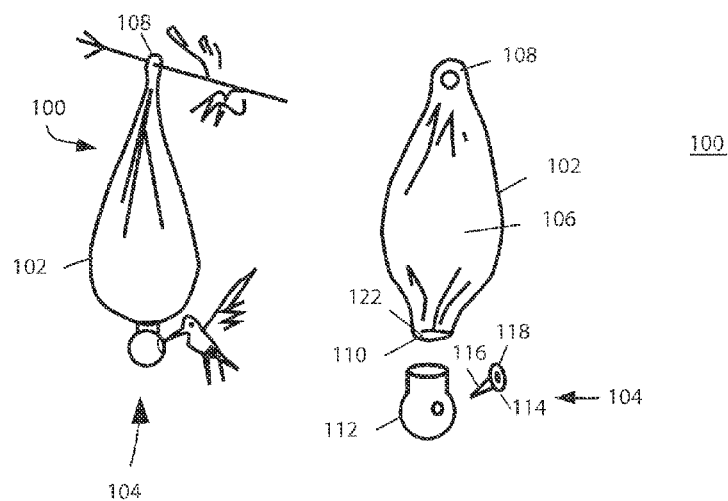
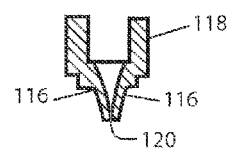
Fig. 1　　　Fig. 2
Fig. 3

ANIMAL FEEDER

CROSS-REFERENCE TO RELATED APPLICATIONS

This application is a continuation of co-pending U.S. patent application Ser. No. 12/080,609, filed Apr. 4, 2008, which application claims priority to U.S. Provisional Patent Application No. 60/993,540, filed Sep. 12, 2007, U.S. Provisional Patent Application No. 60/966,501, filed Aug. 28, 2007, and U.S. Provisional Patent Application No. 60/922,095, filed Apr. 6, 2007, the entire contents of all of which are hereby incorporated by reference.

FIELD OF THE INVENTION

The present invention relates to feeders, and more particularly, to an animal feeder.

SUMMARY

Some embodiments of the present invention provide a feeder including a disposable and/or reusable feed reservoir and a feed dispensing assembly that is detachably coupled to the feed reservoir. The feed reservoir can be a flexible bag supporting a single feed dispensing assembly or a vertically oriented cylinder supporting a plurality of feed dispensing assemblies. The feed reservoir can be preloaded with powder feed to which the user subsequently adds water to fluidize. The feed dispensing assembly includes a check valve for limiting access to the feed and for preventing feed leakage despite fluctuations in temperature, pressure and feed volume within the feed reservoir. Once exhausted of feed, the feed reservoir can be detached from the feed dispensing assembly and disposed of. A new feed reservoir can then be attached to the feed dispensing assembly. In some embodiments, the user is able to replenish the feed in the feed reservoir and reattach the feed reservoir to the feed dispensing assembly.

Other embodiments of the present invention provide a feeder including a disposable feed reservoir and a feed dispensing assembly that is detachably coupled to the feed reservoir. The feed reservoir is a flexible bag and the feed dispensing assembly includes a tray for dispensing feed such as pellets or seed. The feed reservoir can be preloaded with feed. Once exhausted of feed, the feed reservoir can be detached from the feed dispensing assembly and disposed of. A new feed reservoir can then be attached to the feed dispensing assembly. In some embodiments, the user is able to replenish the feed in the feed reservoir and reattach the feed reservoir to the feed dispensing assembly. In some such embodiments, the feeder is reusable.

Some embodiments of the present invention provide an animal feeder including a feed reservoir having a cavity for holding a feed material, and a feed dispensing assembly coupled to the feed reservoir. The feed dispensing assembly includes a check valve to allow selective access to the feed material. The check valve inhibits feed leakage from the feed reservoir during pressure fluctuations within the feed reservoir.

Further embodiments of the present invention provide a method of assembling an animal feeder. The animal feeder includes a feed reservoir for holding a feed material and a feed dispensing assembly having a check valve. The method includes preloading the feed reservoir with the feed material, coupling the feed dispensing assembly to the feed reservoir, inserting the check valve through a portion of the feed dispensing assembly to allow selective access to the feed material, and inhibiting feed leakage from the feed reservoir through the check valve during pressure fluctuations within the feed reservoir.

Other embodiments of the present invention provide a feed reservoir for use with an animal feeder. The animal feeder includes a feed dispensing assembly. The feed reservoir includes a flexible bag for holding a feed material. The flexible bag is configured to couple to the feed dispensing assembly to provide a continuous supply of the feed material to the feed dispensing assembly. Air is substantially inhibited from entering the flexible bag when the flexible bag is coupled to the feed dispensing assembly.

Other aspects of the invention will become apparent by consideration of the detailed description and accompanying drawings.

BRIEF DESCRIPTION OF THE DRAWINGS

FIG. 1 is a side view of a feeder according to an embodiment of the invention mounted to a tree branch.

FIG. 2 is an exploded view of the feeder of FIG. 1 including a feed reservoir, an adapter and a duckbill valve.

FIG. 3 is a sectional view of the duckbill valve of FIG. 2.

DETAILED DESCRIPTION

Figure 4:
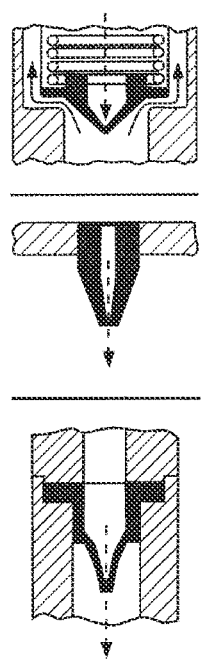
FIG. 4 shows sectional views of duckbill valves for use with embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIGS. 1 and 2 illustrate an animal feeder 100 according to some embodiments of the invention. The feeder 100 can be used for dispensing feed to animals, specifically birds. The feeder 100 can in particular be used for dispensing feed to birds having long bills, such as, for example, hummingbirds. The feeder 100 includes a feed reservoir 102 and a feed dispensing assembly 104.

The feed reservoir 102 is a flexible bag having an interior cavity 106 for holding feed. The feed reservoir 102 can be formed of a waterproof material for holding water or other fluids within the cavity. The feed reservoir 102 includes a hook, loop, latch, adhesive, suction cup or other mechanical or non-mechanical connector for securing the feeder to a support structure such as a wall, post, tree or window. In the illustrated embodiment, the feed reservoir 102 includes a reinforced loop 108 for mounting to a branch. In some embodiments, the feed reservoir 102 is positioned within a rigid protective housing (not shown) to protect the feed reservoir 102 from accidental punctures and tears by animals, tree branches, etc. Such a protective housing can be permanently or removably attached to the feed reservoir 102 and can be formed from plastic, metal, wire mesh, etc.

The feed dispensing assembly 104 is coupled to the feed reservoir 102 at an access port or opening 110 in the feed reservoir 102. In the illustrated embodiment, the feed dispensing assembly 104 is located toward a bottom of the feed reservoir 102 when the feed reservoir 102 is installed on a support structure. The feed dispensing assembly 104 includes an adaptor 112 supporting a valve 114. The adaptor 112 can be detachably coupled to the feed reservoir 102, permitting access to the cavity 106 through the access port 110. In other embodiments, the adaptor 112 can be permanently and/or non-removably secured to the feed reservoir 102.

FIG. 3 shows the valve 114 in greater detail. The valve 114 may be any type of valve that is actuatable by a bird, such as, for example, a check valve. Check valves allow fluid flow in a first direction when actuated, or opened, and inhibit, or check, fluid flow in a second, opposite direction. There are several types of check valves. In the illustrated embodiment, the valve 114 is a duckbill valve or a duckbill check valve. The valve 114 includes opposing flexible lip members 116 supported on a ring 118. The ring 118 is coupled to adaptor 112 so that the lip members 116 extend towards the cavity 106 in a V-shape. The lip members 116 are compressed against one another along a lip 120. The durometer or flexibility of the lip members 116 can be such that the lip members 116 are easily deflected toward and away from one another. In addition, the lip members 116 extend into the adaptor 112 to inhibit spillage of feed material within feeder 100 when a user is carrying the feeder 100.

The valve 114 is constructed such that the valve 114 is normally in a closed position, i.e., the lip members 116 are compressed against one another, when feed is not being accessed. This can be accomplished by preloading the lip members 116 such that the lip members 120 are tightly compressed against one another. In other embodiments, the valve 114 is constructed such that the valve 114 is normally in a substantially closed position, i.e., the lip members 116 are retained in a closed position by the feed in the cavity 106 impinging on the lip members 116, which reinforces the lip compression, preventing leakage of feed from the feed reservoir 102. Although the valve 114 can be located anywhere on the feed reservoir 102, by locating the valve 114 toward the bottom of the feed reservoir 102, substantially any feed in the reservoir 102 impinges on the valve 114 under the influence of gravity. As such, a minimal amount of feed can retain the valve 114 in a closed configuration.

The valve 114 also remains closed despite fluctuations in air pressure within the feed reservoir 102 or if the air pressure within the feed reservoir 102 exceeds the atmospheric pressure outside of the feed reservoir 102. Fluctuations in pressure within the feed reservoir 102 can be caused by temperature changes, or changes in feed volume within the cavity 106. In other words, it is not necessary for the air pressure in the feed reservoir 102 to be lower than the atmospheric pressure so as to prevent feed leakage. This is in contrast to vertical water dispensing vessels used to provide water to cats and dogs. In such an arrangement, negative pressure above the fluid in the vessel is needed in order to prevent the fluid from leaking out of the vessel. Such an arrangement requires an air tight, rigid vessel to maintain the pressure in the vessel above the fluid line. In contrast, the construction of the duckbill valve prevents feed leakage, so that the feed reservoir 102 can be formed of a flexible material, and openings in the feed reservoir 102 above the feed line do not cause feed leakage at the valve 114.

Furthermore, the valve 114 can be oriented in substantially any direction on the feeder 100. Since the valve 114 does not include a ball that relies on gravity to close the valve 114, the valve may be positioned facing the ground, horizontal to the ground, facing away from the ground, or in any positions therebetween.

The feed is accessed by inserting a member through the ring 118 between the lip members 116, thereby creating a gap at the lip 120 through which feed is released. Typically, the beak or bill of an animal such as a hummingbird is inserted into the valve 114 to access the feed. Both the diameter of the ring 118 and the distance between the ring 118 and the lip 120 can be sized to restrict access to the feed reservoir 102.

The duckbill valve 114 can have a variety of configurations in accordance with embodiments of the invention, some of which are illustrated in FIG. 4. In addition, U.S. Pat. No. 5,010,925 describes a duckbill valve that can be used for embodiments of the invention, and is incorporated by reference herein.

Figure 5:
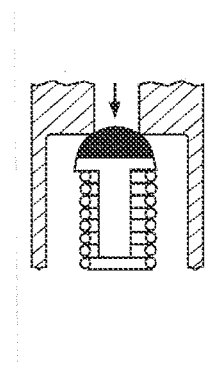
FIG. 5 shows a sectional view of a poppet valve.
Figures 6, 7, 8:
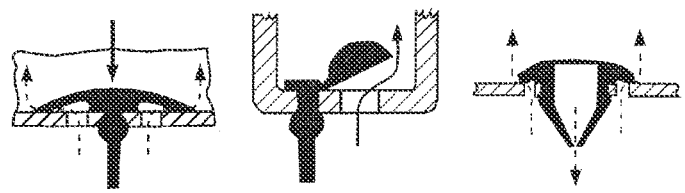
FIG. 6 shows a sectional view of an umbrella valve.
FIG. 7 shows a sectional view of a flapper valve.
FIG. 8 shows a sectional view of a combination duckbill and umbrella valve.

FIGS. 5-8 illustrate other types of check valves that can be substituted for the duckbill valve 114 illustrated in FIG. 3. FIG. 5 illustrates a poppet check valve, FIG. 6 illustrates an umbrella check valve, FIG. 7 illustrates a flapper valve, and FIG. 8 illustrates a combination duckbill-umbrella check valve.

The type of check valve can be selected to encourage and/or inhibit various types of animals such as birds from accessing feed in the animal feeder 100. For example, depending on the physiology of the bird, such as the shape of the bird's beak, some check valves are more easily accessed. In another example, it has been found that hummingbirds tend to avoid the taste of metal. Therefore, the check valve may be selected to ensure that a hummingbird would encounter only plastic parts. The illustrated check valves are also composed of a soft, flexible plastic, silicon, or another elastomeric material that simulates the feel of a real flower. When the bird contacts or inserts his/her beak into the valve, the soft plastic gives way in a manner similar to a flower.

Check valves also inhibit rain from entering the feed reservoir 102 and, thereby, diluting or otherwise contaminating the feed material in the reservoir 102. The check valves not only inhibit direct dripping of rain into the feed reservoir 102, but also prevent water sliding along an outside surface of the reservoir 102 from seeping or weeping into the reservoir 102. Furthermore, the check valves inhibit insects (e.g., ants, bees, or the like) from crawling into the reservoir, while allowing birds to open the valves with their beaks.

In some embodiments, the feed reservoir 102 is preloaded with a solid or fluid feed material. In some embodiments, the feed reservoir 102 is preloaded with a solid or semi-solid feed material such as suet. In other embodiments, the feed reservoir 102 is preloaded with a powdered or otherwise incomplete feed material (e.g., a liquid feed concentrate) and the user subsequently adds a fluid such as water into the feed reservoir 102 to fluidize the feed. In some embodiments, the feed reservoir 102 comes completely filled with a ready-to-use feed material.

The feed reservoir 102 can be formed of a material selected to inhibit destruction by pests attracted to the animal feed contained therein, including, for example, squirrels. In one embodiment, the feed reservoir 102 is formed of a material such as plastic that is coated or imbued with a foul tasting agent. When a squirrel attempts to chew on the feed reservoir 102 so as to bypass the feed dispensing assembly 104, the foul taste encountered at the feed reservoir 102 discourages continued chewing.

The feed dispensing assembly 104 can be permanently attached or integrally formed with the feed reservoir 102 to prevent replenishment of feed within the feed reservoir 102. In this sense, the entire feeder 100 is disposable, in that the feeder 100 can only be exhausted once, after which the feeder 100 can be thrown away.

In other embodiments, the feed dispensing assembly 104 can be detachably coupled to the feed reservoir 102. This allows the user to remove the feed dispensing assembly 104 from the feed reservoir 102 to fluidize the feed, or to first fluidize the feed within the feed reservoir 102 and then install the feed dispensing assembly 104 on the feed reservoir 102. If a protective housing is provided as previously discussed (not shown), the protective housing can be discarded along with the exhausted feed reservoir 102. Alternately, the protective housing can be permanently attached to the feed dispensing assembly 104 such that only the feed reservoir 102 is discarded.

The feed reservoir 102 can be sold separately from the feed dispensing assembly 104, such that when a feed reservoir 102 is exhausted, the feed dispensing assembly 104 is removed from the feed reservoir 102 and the feed reservoir 102 is disposed of. The same feed dispensing assembly 104 can then be installed on a new feed reservoir 102. Replacement feed reservoirs 102 can be sold in pre-packaged multiples of 3-7. This arrangement is similar in concept to personal grooming razors with replaceable blade cartridges. This allows the user to avoid cleaning and refilling the feed reservoir 102. Nonetheless, the user is free to detach the feed dispensing assembly 104, replenish the feed within the exhausted feed reservoir 102, and then reattach the feed dispensing assembly 104, so that the feeder 100 can be replenished and exhausted repeatedly. Alternatively or in addition, by replacing the feed reservoir, the transmission of disease between animals feeding from the feeder and between the animals and humans can be reduced.

Figure 9:
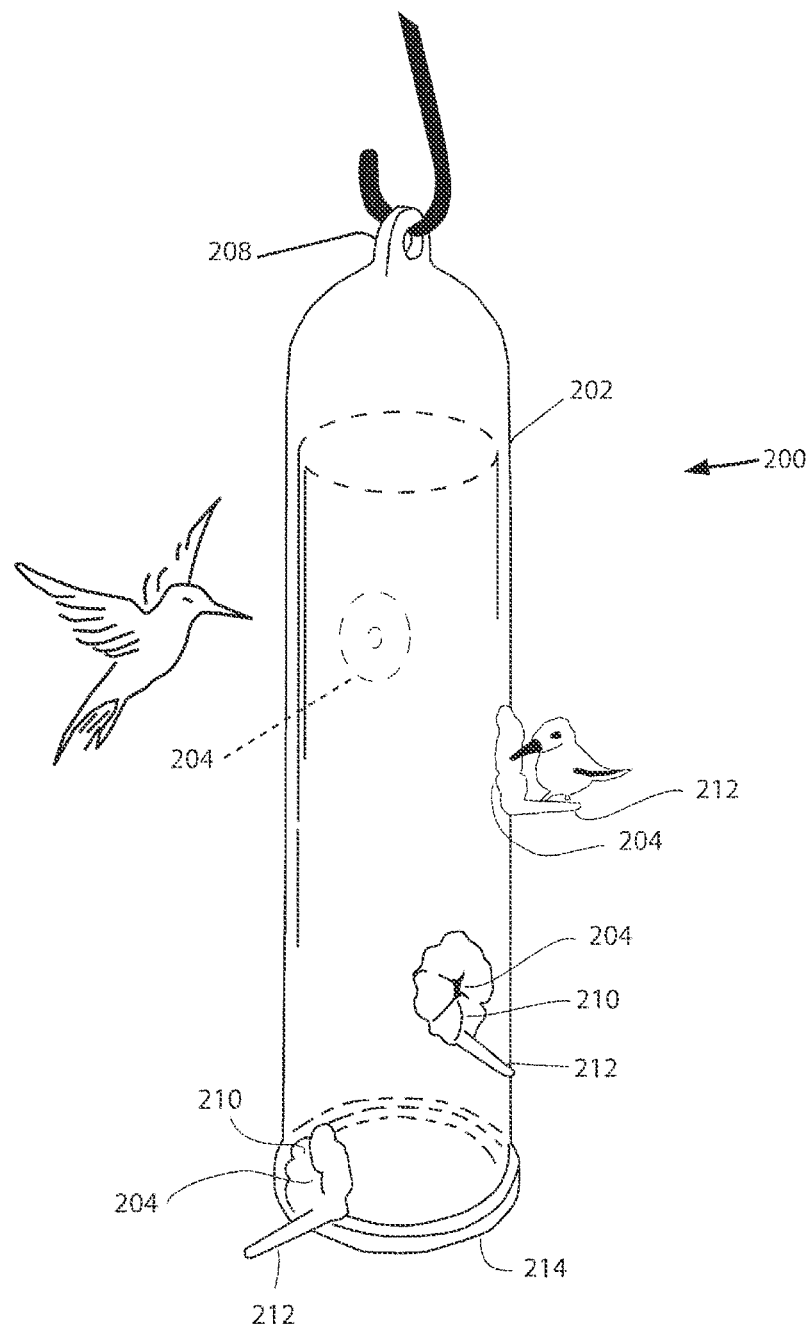
FIG. 9 is a perspective view of a feeder according to another embodiment of the invention.

FIG. 9 illustrates a feeder 200 according to another embodiment of the invention. The feeder 200 includes a feed reservoir 202 and a plurality of feed dispensing assemblies 204 supported on the feed reservoir 202. The feeder 200 permits multiple animals to feed simultaneously.

In the illustrated embodiment, the feed reservoir 202 is a generally cylindrical member defining an inner cavity for holding feed. The feed reservoir 202 can be formed of a rigid material or can be foamed of a flexible material. In other embodiments, the feed reservoir 202 includes an inner flexible sac or bag protected by a rigid outer housing. The feed reservoir 202 includes a hook, loop, latch, adhesive, suction cup or other mechanical or non-mechanical connector for securing the feeder to a support structure such as a wall, post, tree or window. In the illustrated embodiment, the feed reservoir 202 includes a reinforced loop 208 for mounting the feeder 200 to a support structure (not shown).

The feed dispensing assemblies 204 are supported on the feed reservoir 202 at access ports (not shown) for providing access to feed within the feed reservoir 202. The feed dispensing assemblies 204 can include an adaptor and a valve, or simply a valve supported directly on the feed reservoir 202. The valve can be a check valve such as a duckbill valve, as previously described. In other embodiments, the valve is replaced with a spout or other passive element for accessing the feed.

A decorative element 210 can be incorporated into the feed dispensing assemblies 204 to provide a more pleasing aesthetic both for the pleasure of animal watchers and for encouraging use of the feeder 200. In the illustrated embodiment, a flower design is incorporated into the feed dispensing assemblies 204. The feed dispensing assemblies 204 can also include perches or supports 212 for facilitating access to the feed dispensing assembly 204. In other embodiments, the perches 212 are incorporated into the feed reservoir 202 or are not included at all. In still other embodiments, a valve can be incorporated with a decorative element 210. The decorative element 210 and the perch 212 help attract birds to the feeder 200.

In some embodiments, the feed reservoir 202 is preloaded with a solid or fluid feed material. In other embodiments, the feed reservoir 202 is preloaded with a semi-solid feed material such as suet. In other embodiments, the feed reservoir 202 is preloaded with a powdered or otherwise incomplete feed material and the user subsequently adds a fluid such as water into the feed reservoir 202 to fluidize the feed. In some embodiments, the feed reservoir 102 comes completely filled with a ready-to-use feed material.

The feed dispensing assemblies 204 can be permanently attached or integrally formed with the feed reservoir 202 to prevent replenishment of feed within the feed reservoir 202. In this sense, the feeder 200 is entirely disposable, in that the feeder 200 can only be exhausted once, after which the feeder 200 is disposed of. In other embodiments, one or more of the feed dispensing assemblies 204 can be detachably coupled to the feed reservoir 202. This allows the user to remove at least one of the feed dispensing assemblies 204 from the feed reservoir 202 to fluidize the feed, or to replenish feed within the feed reservoir 202. In still other embodiments, a separate port 214 is provided in the feed reservoir 202 for fluidizing or replenishing the feed, or cleaning the interior of the feed reservoir 202.

Figure 10:
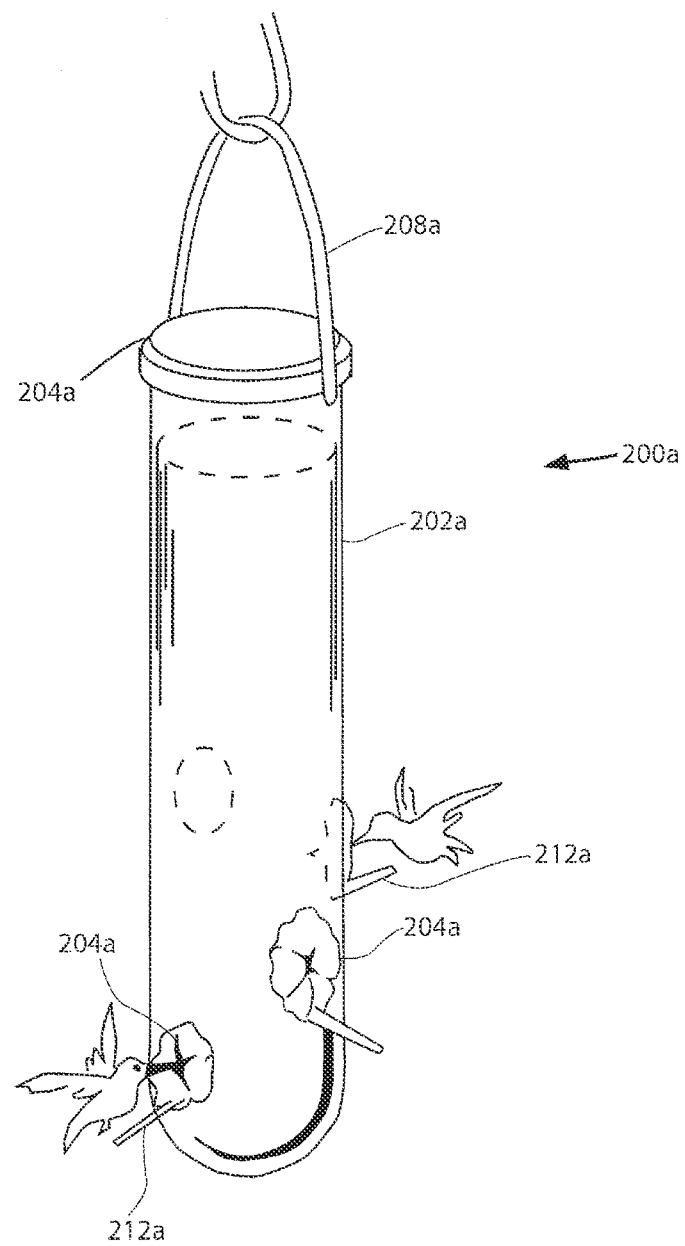
FIG. 10 is a perspective view of a feeder according to another embodiment of the invention.
Figure 11:
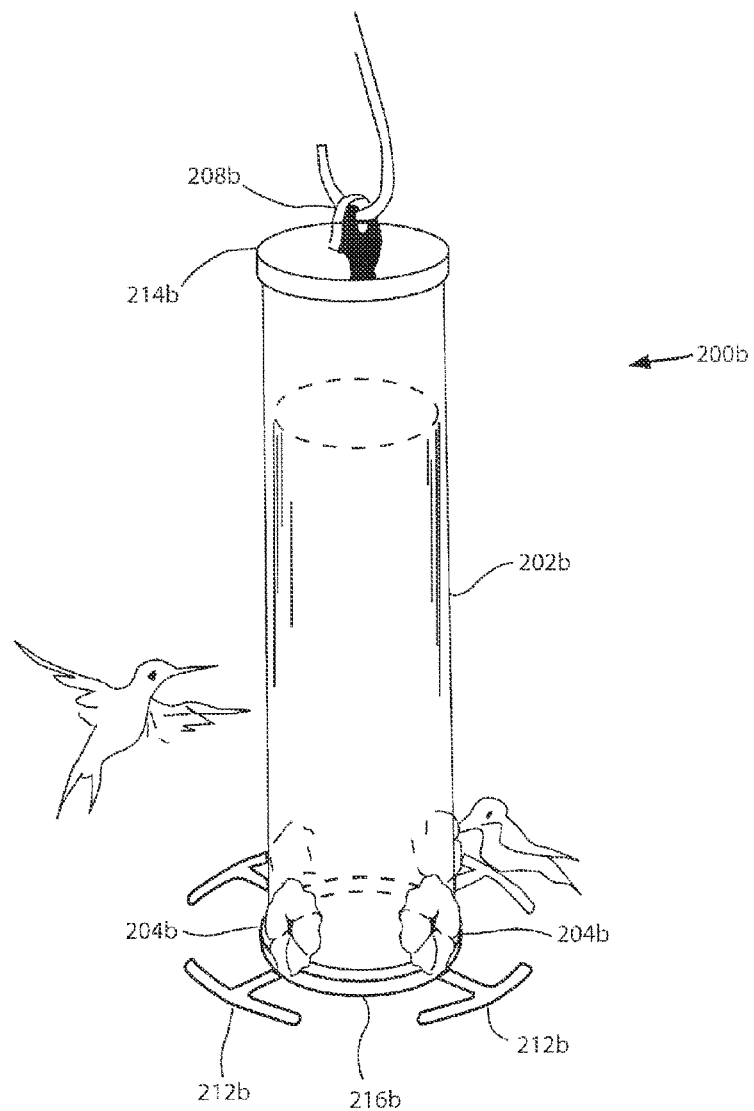
FIG. 11 is a perspective view of a feeder according to another embodiment of the invention.

FIGS. 10 and 11 illustrate feeders 200a and 200b that are similar to feeder 200. Feeder 200a is an inverted version of feeder 200, in which the port 214a is located at an upward end of the feeder 200a rather than at a lower end. Feeder 200b is also an inverted version of feeder 200, and provides the feed dispensing assemblies 204b at a lower portion of the feeder 200b. In addition, the perches 212b are formed or coupled to a base member 216b rather than directly to the feed dispensing assemblies 204b.

Figure 12:
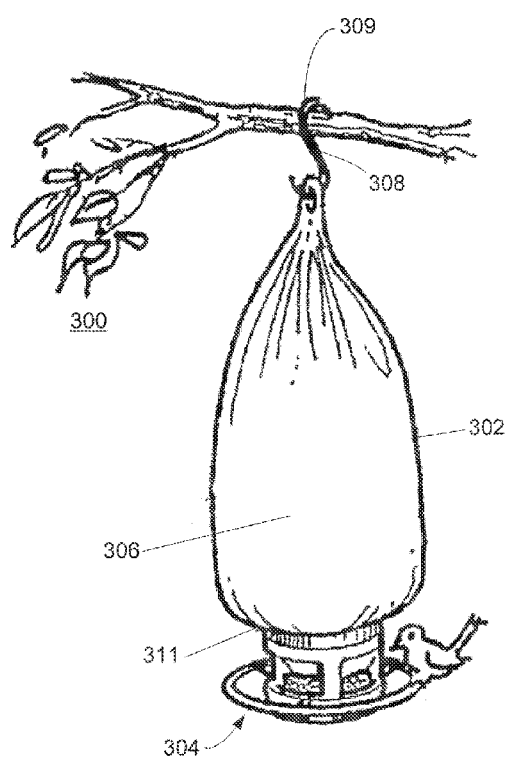
FIG. 12 is a side view of a feeder according to another embodiment of the invention mounted to a tree branch.
Figure 13:
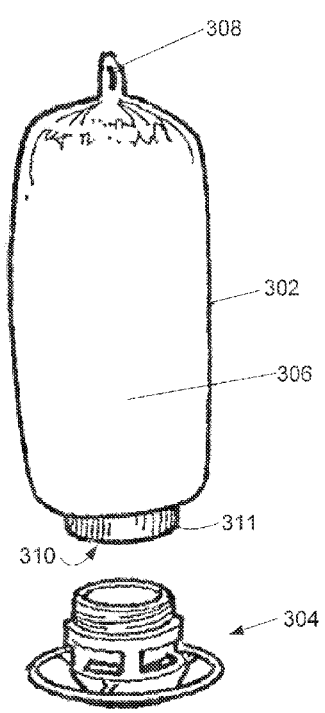
FIG. 13 is an exploded view of the feeder of FIG. 12 including a feed reservoir and a feed dispensing assembly.

FIGS. 12 and 13 illustrate a feeder 300 according to another embodiment of the invention. The feeder 300 includes a feed reservoir 302 detachably coupled to a feed dispensing tray 304. The feed reservoir 302 includes a hook and loop or other mechanical or non-mechanical connector for securing the feeder to a support structure. In the illustrated embodiment, the feed reservoir 302 includes a reinforced loop 308 for receiving a first portion of a hook member 309. A second portion of the hook member 309 is supported on a support structure such as a branch.

The feed reservoir 302 has an internal cavity 306 for holding a quantity of feed. A bottom portion of the feed reservoir 302 includes a threaded retaining ring 311 for coupling the feed dispensing tray 304 to the feed reservoir 302. The retaining ring 311 defines an opening or access port 310 in the feed reservoir 302 so that feed within the cavity 306 falls to the feed dispensing tray 304 for dispensing. In some embodiments, the feed reservoir 302 can include a removable seal positioned across the retaining ring 311 for retaining feed in the feed reservoir 302 prior to assembly of the feeder 300.

Once exhausted, the feed reservoir 302 can be detached from the feed dispensing tray 304 and disposed of. A new feed reservoir 302, preloaded with feed, can be attached to the feed dispensing tray 304 so that the feed dispensing tray 304 can be reused. Of course, the user is free to replenish the feed within an exhausted feed reservoir 302 and reattach the replenished feed reservoir 302 to the feed dispensing tray 304.

Figures 14, 15:
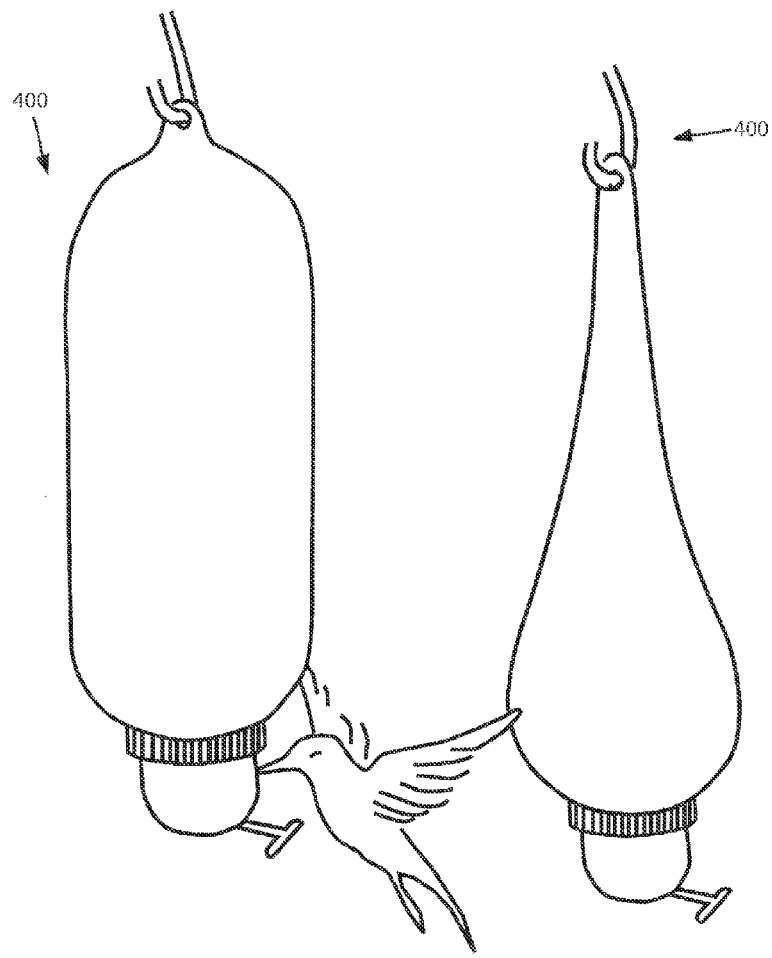
FIG. 14 is a side view of a feeder according to another embodiment of the invention mounted to a tree branch, the feeder in a full position.
FIG. 15 is a side view of the feeder of FIG. 14 in a collapsed position.

FIGS. 14 and 15 illustrate a feeder 400 according to another embodiment of the invention. The feeder 400 is similar to the feeders 100 shown in FIGS. 1 and 2.

Figure 16:
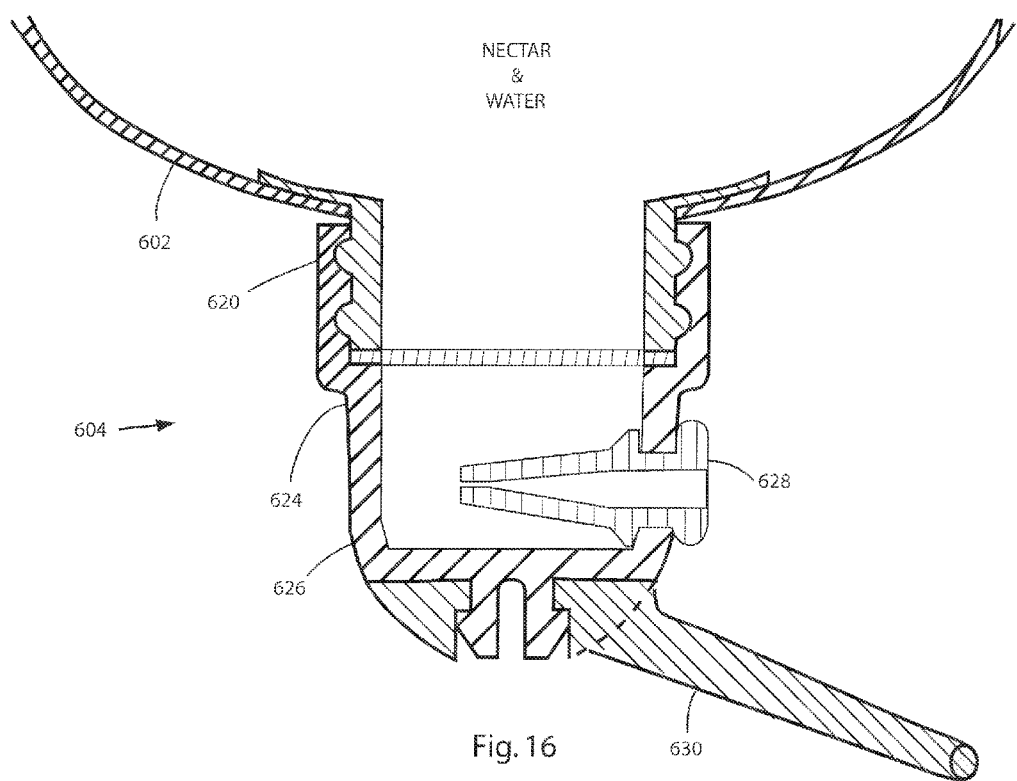
FIG. 16 is a sectional view of a feeder according to another embodiment of the invention.
Figure 17:
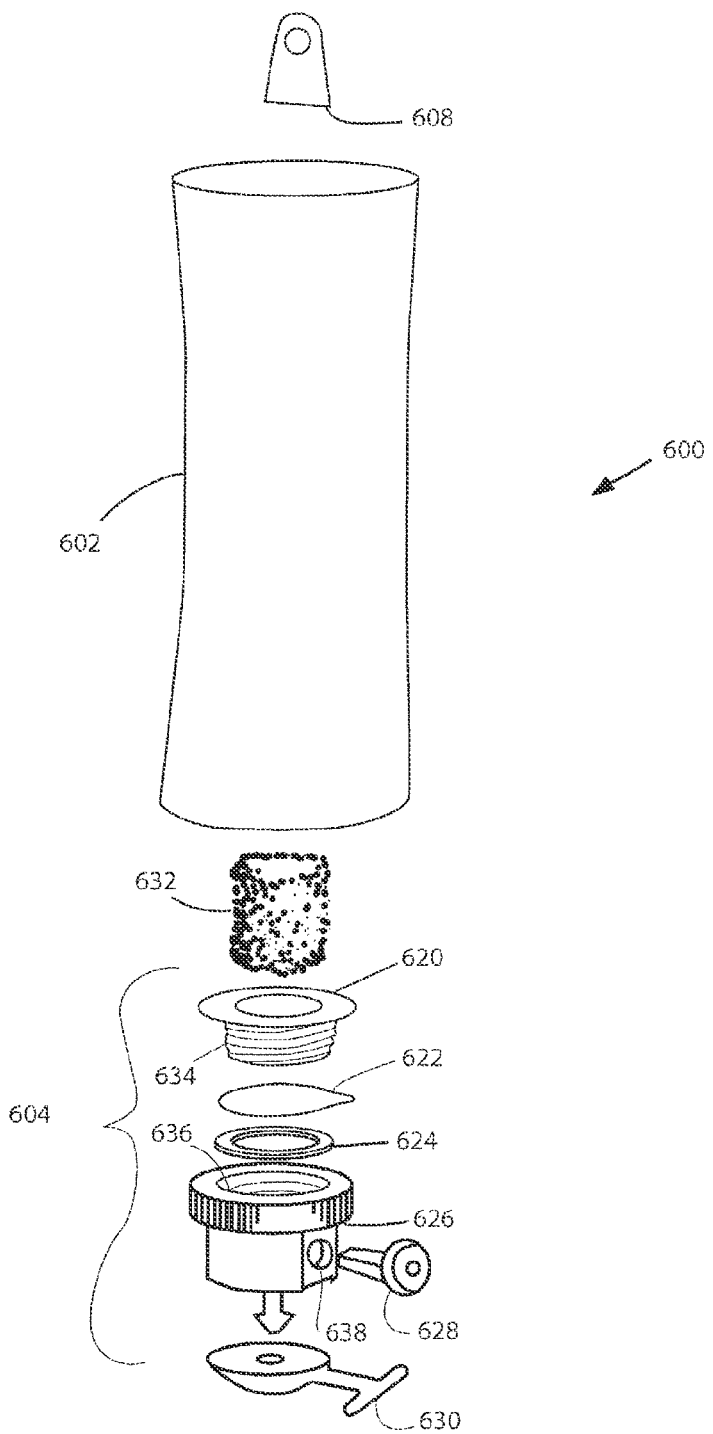
FIG. 17 is an exploded perspective view of the feed dispensing assembly of FIG. 16.

FIGS. 16 and 17 illustrate a feeder 600 according to another embodiment of the invention. The feeder 600 includes a feed reservoir 602 and a feed dispensing assembly 604. The feed dispensing assembly 604 includes a fitment 620, a seal 622, a gasket 624, a reservoir 626, a check valve 628, and a perch 630. Also shown is an example of animal feed for use with the feeder 600, a bolus of granulated nectar 632.

The feed reservoir 602 can be made of an elastic and/or flexible material and can be a bag. The feed reservoir 602 can be formed of a metallized film material and can include graphics or other decorative and/or advertising images. The feed reservoir 602 includes a reinforced loop 608 for hanging the feeder 600 from a support structure.

The fitment 620 includes male threads 634 and can be made of a plastic material. The seal 622 can be made of foil or other metal sheet. The reservoir 626 can be formed of plastic and includes female threads 636 for threadably coupling to the fitment. The gasket 624 and the seal 622 are disposed in between the fitment 620 and the reservoir 626. In one embodiment, the feed dispensing assembly 604 is at least partially disassembled and the seal 622 removed so that the feed dispensing assembly 604 can be reassembled for use.

The reservoir 626 includes a port 638 for receiving the check valve 628. The check valve 628 can snap-fit or otherwise couple to the reservoir 626 for dispensing feed therethrough. The perch 630 couples to the reservoir 626 adjacent to the check valve 628 for easy reach by a bird or animal located on the perch 630. In the illustrated embodiment, the perch 630 is snap-fit to the reservoir 626.

Figures 18, 19:
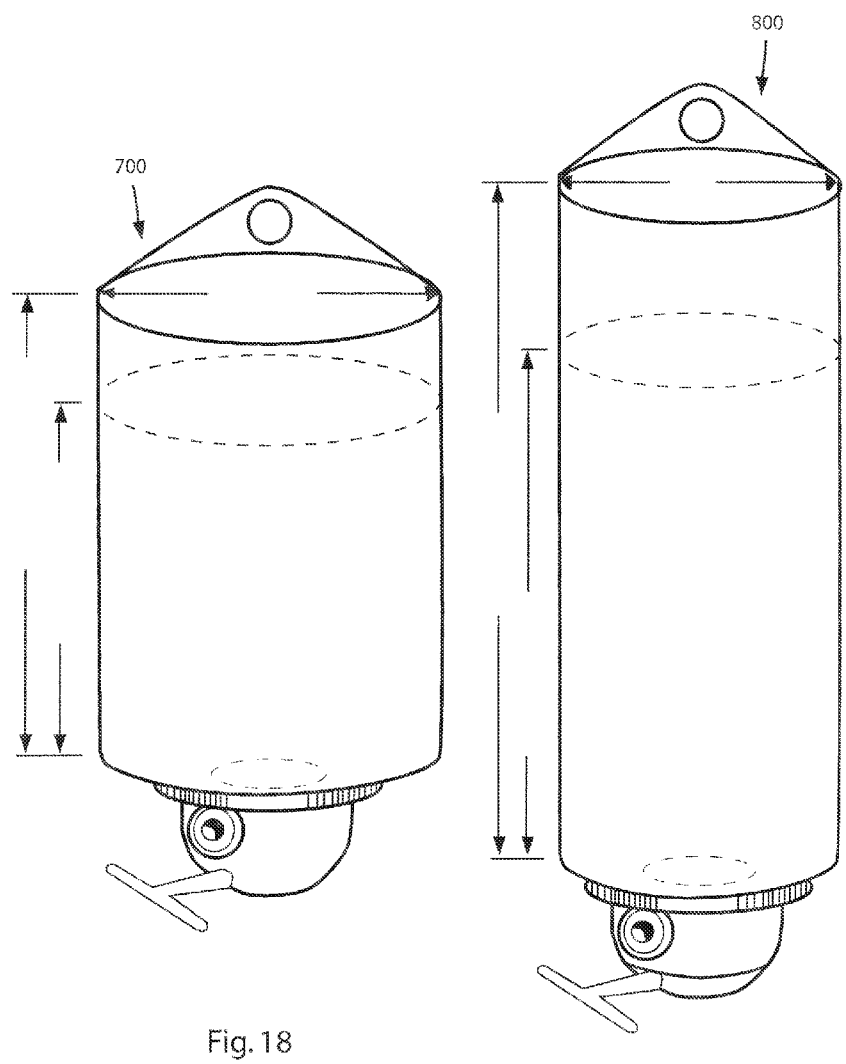
FIG. 18 is a perspective view of a feeder according to another embodiment of the invention.
FIG. 19 is a perspective view of a feeder according to another embodiment of the invention.

FIGS. 18 and 19 illustrate a feeder 700 and a feeder 800, respectively, according to other embodiments of the invention.

Figure 20:
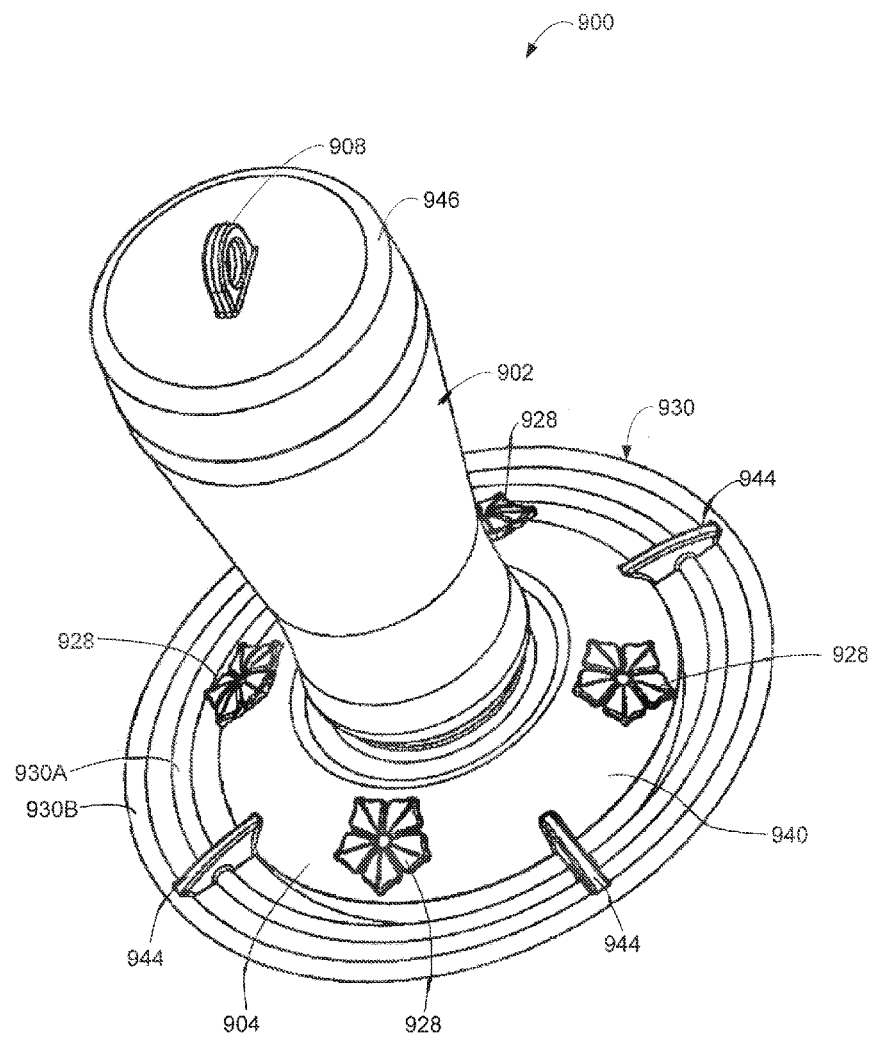
FIG. 20 is a perspective view of a feeder according to yet another embodiment of the invention.
Figure 21:
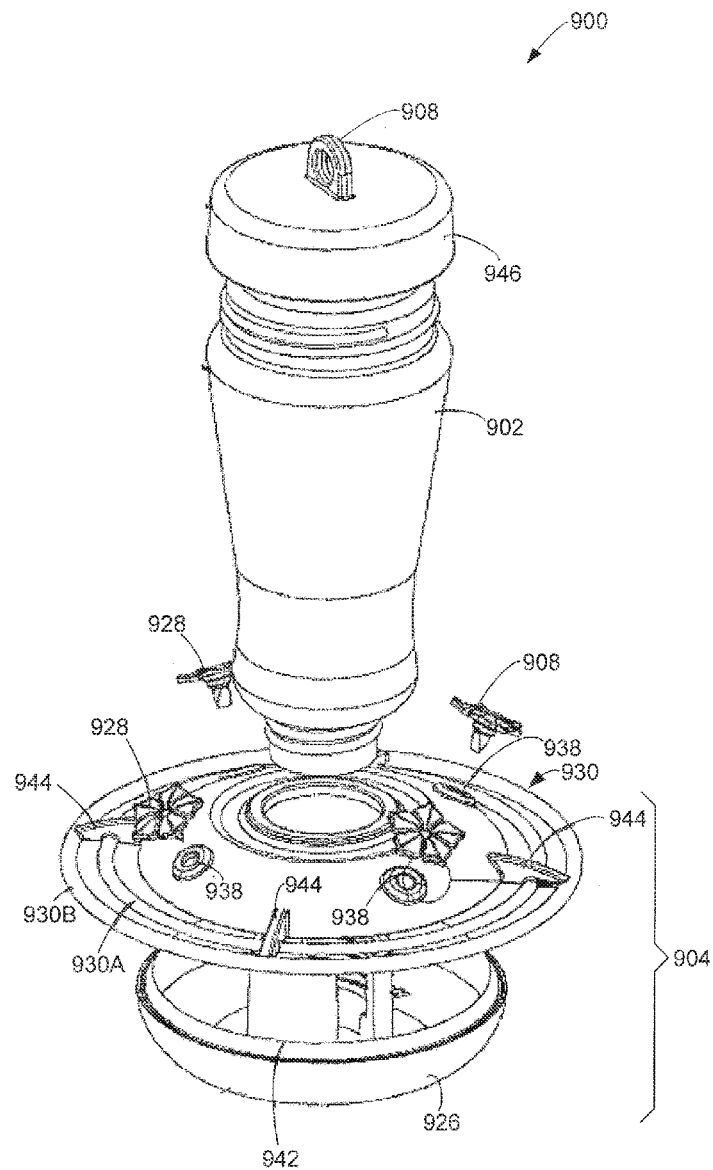
FIG. 21 is an exploded perspective view of the feeder of FIG. 20.
Figure 22:
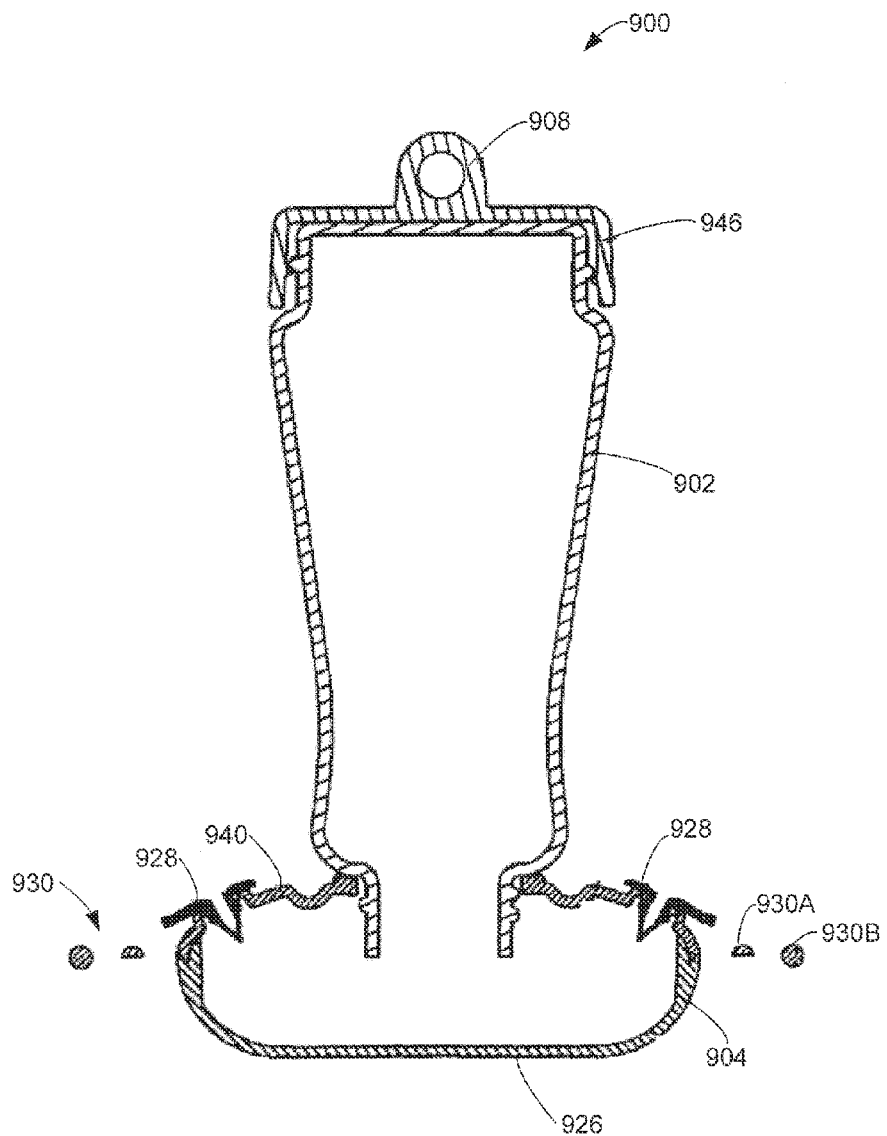
FIG. 22 is a cross-sectional view of the feeder of FIG. 20.

FIGS. 20-22 illustrate a feeder 900 according to yet another embodiment of the invention. The feeder 900 includes a feed reservoir 902 and a feed dispensing assembly 904. The feed reservoir 902 can be made of an elastic material, a metallized film material, a glass material, or the like and can include graphics or other decorative and/or advertising images. In embodiments where the feed reservoir 902 includes or is composed of metallized film material, the bright or glossy appearance of the metalized film helps attract birds. In addition, printing metallic flowers on the reservoir 902 further helps attract birds.

In the illustrated embodiment, the feed reservoir 902 is a flexible bag that collapses (i.e., decreases in volume) as feed material is emptied from the bag. When the feed reservoir 902 is coupled to the feed dispensing assembly 904, the feed reservoir 902 can continuously pour fluid (e.g., liquidized feed material) into a bird's mouth without requiring air to be vented or circulated back into the reservoir 902. In some embodiments, the liquidized feed material may be poured into a bird's mouth at about ¼ pounds per square inch (psi) per second. Such an arrangement prevents air, and more particularly oxygen, from entering the reservoir 902 and contaminating the feed material. Without oxygen, the amount of aerobic bacteria that may grow in the bag is significantly reduced, thereby reducing the possibility of a bird using the feeder 900 becoming sick. To counteract aerobic bacteria growth, conventional (e.g., rigid) feeders should typically be cleaned every three to four days. However, flexible bags may be cleaned significantly less often, or simply disposed of after use.

The feed dispensing assembly 904 includes a reservoir 926, four check valves 928, a perch 930, and an upper housing 940. The illustrated reservoir 926 includes an upwardly extending adaptor or boss 942 for threadably coupling to a lower portion of the feed reservoir 902. The upper housing 940 fits between the feed reservoir 902 and the reservoir 926 to substantially cover feed held within the feed reservoir 902. In the illustrated embodiment, the upper housing 940 includes four ports 938 corresponding to the four check valves 928. The check valves 928 can snap-fit or otherwise couple to the upper housing 940 for dispensing feed from the reservoir 926 therethrough. In some embodiments, an interference fit or a labyrinth seal may be used to hold and seal the check valves 928 to the reservoir 926. In some embodiments, a gasket can surround each port 938 to seal between the upper housing 940 and the check valves 928.

In the illustrated embodiment, the perch 930 includes two concentric rings 930A, 930B surrounding the reservoir 926 and the check valves 928. The upper housing 940 includes radially extending supports 944 to couple the rings 930A, 930B to the upper housing 940. The rings 930A, 930B may be snap-fit, glued, or otherwise secured to the supports 944.

The feeder 900 also includes a cap 946 removably coupled to an upper portion of the feed reservoir 902. The cap 946 includes a loop 908 for hanging the feeder 900 from a branch or other support structure. The cap 946 is removably coupled to the feed reservoir 902 such that a user may detach the feed reservoir 902 from the cap 946 without having to remove the loop 908 from the branch.

It should be appreciated that the invention is not limited to the embodiments shown in FIGS. 1-22. For example, the feeder can have a wide variety of shapes and configurations adapted to feed different types of birds and other animals in different habitats and in different weather conditions. Also, while reference is made herein to disposable feeders, each of the embodiments of the feeder of the present invention can also or alternatively be refilled and/or reused two or more times.

Thus, the invention provides, among other things, a disposable feeder for dispensing feed to a bird. The present invention also provides a reusable feeder which can be refilled and/or reused two or more times.

Various features and advantages of the invention are set forth in the following claims.

The invention claimed is:

1. A feed reservoir for use with an animal feeder, the animal feeder including a feed dispensing assembly, the feed reservoir comprising:
   a flexible bag for holding a feed material, the flexible bag configured to couple to the feed dispensing assembly to provide a continuous supply of the feed material to the feed dispensing assembly;
   wherein air is substantially inhibited from entering the flexible bag when the flexible bag is coupled to the feed dispensing assembly.

2. The feed reservoir of claim 1, wherein the flexible bag is imbued with a foul tasting agent.

3. The feed reservoir of claim 1, wherein the flexible bag is detachably coupled to the feed dispensing assembly.

4. The feed reservoir of claim 3, wherein the flexible bag is disposable.

5. The feed reservoir of claim 3, wherein the flexible bag is reusable.

6. The feed reservoir of claim 1, wherein the flexible bag extends substantially vertically from an upper portion to a lower portion, and wherein the feed dispensing assembly is configured to couple to the lower portion.

7. The feeder reservoir of claim 6, wherein the animal feeder includes a connector to support the animal feeder from a support structure, and wherein the connector is configured to couple to the upper portion of the flexible bag.

8. An animal feeder comprising:
   a feed reservoir having a flexible bag for holding a feed material; and
   a feed dispensing assembly detachably coupled to the feed reservoir, the feed dispensing assembly including a valve to allow animals selective access to the feed material, wherein at least a portion of the feed dispensing assembly is imbued with a foul tasting additive.

9. The animal feeder of claim 8, wherein the valve is a duckbill valve including at least two lip members, and wherein, when the feed material is not being accessed, the at least two lip members are compressed against one another to inhibit feed leakage.

10. The animal feeder of claim 8, wherein the feed dispensing assembly includes a perch positioned adjacent the valve.

11. The animal feeder of claim 8, wherein the feed reservoir includes a plurality of check valve assemblies to allow selective access to the feed material.

12. The animal feeder of claim 8, wherein the feed reservoir extends substantially vertically from an upper portion to a lower portion, and wherein the feed dispensing assembly is coupled to the lower portion.

13. An animal feeder comprising:
   a feed reservoir defining a cavity therein, the feed reservoir having a first end defining an access recess and a second end opposite the first end;
   liquid feed material at least partially contained within the cavity to define a feed material fluid level;
   a cap removably couplable to the first end of the feed reservoir to selectively seal the access recess; and
   a feed dispensing assembly coupled to the second end of the feed reservoir, the feed dispensing assembly including a check valve positioned below the feed material fluid level to allow selective access to the cavity, the check valve inhibiting air from entering the cavity unless placed in an activated position, and wherein the check valve may be placed in an activated position by a bird.

14. An animal feeder comprising:
   a feed reservoir defining a cavity;
   liquid feed material at least partially contained within the cavity to define a feed material fluid level; and
   a check valve in fluid communication with the cavity and positioned below the feed material fluid level, wherein the check valve is a duckbill valve including at least two lip members, and wherein, when the feed material is not being accessed, the at least two lip members are compressed against one another to inhibit air from entering the cavity.

15. The animal feeder of claim 14, wherein the two lip members are compressed against one another at least partially by fluid pressure provided by the liquid feed material.

16. The animal feeder of claim 14, wherein the check valve includes an opening, and wherein the opening faces away from the ground.

* * * * *